(12) United States Patent
Houweling et al.

(10) Patent No.: US 11,673,820 B2
(45) Date of Patent: Jun. 13, 2023

(54) WASTEWATER TREATMENT WITH SUSPENDED GROWTH AND MEMBRANE AERATED BIOFILM

(71) Applicant: BL TECHNOLOGIES, INC., Minnetonka, MN (US)

(72) Inventors: Dwight Cornelius Houweling, Oakville (CA); John David Ireland, Oakville (CA); Douglas Joseph Thompson, Hamilton (CA); Jeffrey Gerard Peeters, Oakville (CA)

(73) Assignee: BL Technologies, Inc.

( * ) Notice: Subject to any disclaimer, the term of this patent is extended or adjusted under 35 U.S.C. 154(b) by 0 days.

(21) Appl. No.: 16/973,750

(22) PCT Filed: Jun. 27, 2018

(86) PCT No.: PCT/US2018/039769
§ 371 (c)(1),
(2) Date: Dec. 9, 2020

(87) PCT Pub. No.: WO2020/005232
PCT Pub. Date: Jan. 2, 2020

(65) Prior Publication Data
US 2021/0253460 A1    Aug. 19, 2021

(51) Int. Cl.
*C02F 3/10*    (2023.01)
*C02F 3/00*    (2023.01)
(Continued)

(52) U.S. Cl.
CPC .............. *C02F 3/102* (2013.01); *C02F 3/006* (2013.01); *C02F 3/208* (2013.01); *C02F 3/302* (2013.01);
(Continued)

(58) Field of Classification Search
CPC .......... C02F 3/1278; C02F 3/06; C02F 3/104; C02F 3/108; C02F 3/109; C02F 2203/006;
(Continued)

(56) References Cited

U.S. PATENT DOCUMENTS 7,160,442 B2 *    1/2007    Horng .................... B01D 61/18
                                                    210/150
7,699,985 B2 *    4/2010    Cote .................... B01D 69/084
                                                    210/615
(Continued)

FOREIGN PATENT DOCUMENTS

CA        2300719 A1 *    9/2001
CN        104909520 A     9/2015
(Continued)

OTHER PUBLICATIONS

JP2009285582A_SEKINE_translated.pdf (Year: 2009).*
(Continued)

*Primary Examiner* — Nam X Nguyen
*Assistant Examiner* — Ekandra S. Miller-Cruz (57) ABSTRACT

A hybrid membrane aerated biofilm reactor (MABR) and activated sludge (AS) system and process are described herein. At least a portion of the AS system includes aerobic mixed liquor, for example in an aerobic tank or zone downstream of a tank or zone containing membrane aerated biofilm modules. The flow of air to the membrane aerated biofilm is modulated considering the ammonia loading rate to the system or to the aerobic mixed liquor, for example according to a diurnal cycle. For example, air flow to the membrane supported biofilm can be below an average or initial air flow rate during a period of low ammonia loading. Air flow to the aerobic mixed liquor may remain essentially constants during the same period. Optionally, mixed liquor
(Continued)

around the membrane aerated biofilm modules may be aerated during a period of high ammonia loading.

14 Claims, 3 Drawing Sheets

(51) Int. Cl.
  *C02F 3/20* (2023.01)
  *C02F 3/30* (2023.01)
  *C02F 101/16* (2006.01)

(52) U.S. Cl.
  CPC .... *C02F 2101/16* (2013.01); *C02F 2209/001* (2013.01); *C02F 2209/14* (2013.01); *C02F 2209/16* (2013.01); *C02F 2209/225* (2013.01); *C02F 2305/02* (2013.01)

(58) Field of Classification Search
  CPC ............ C02F 2209/08; C02F 2301/046; C02F 2303/16; C02F 2209/40; Y02W 10/10; Y02W 10/37
  USPC ........................................................ 210/151
  See application file for complete search history.

(56) References Cited

U.S. PATENT DOCUMENTS

| | | | | |
|---|---|---|---|---|
| 11,485,655 | B2 * | 11/2022 | Suda | .................... C02F 3/1268 |
| 2008/0110827 | A1 | 5/2008 | Cote et al. | |
| 2010/0072130 | A1 * | 3/2010 | Fane | ........................ C02F 1/04 |
| | | | | 210/605 |
| 2011/0284461 | A1 * | 11/2011 | DiMassimo | ............ C02F 3/006 |
| | | | | 210/616 |
| 2014/0319055 | A1 | 10/2014 | Doyle et al. | |
| 2016/0009578 | A1 | 1/2016 | Cote et al. | |
| 2017/0088449 | A1 | 3/2017 | Cote et al. | |

FOREIGN PATENT DOCUMENTS

| | | | |
|---|---|---|---|
| CN | 107867755 A | 4/2018 | |
| EP | 3790847 A1 | 3/2021 | |
| JP | 2009285582 A * | 12/2009 | ............ Y02W 10/10 |
| JP | 4543649 B2 * | 9/2010 | ................ C02F 1/44 |
| JP | 2010194481 A * | 9/2010 | ............ Y02W 10/10 |
| JP | 2015127027 A * | 7/2015 | ............ Y02W 10/10 |
| WO | 2016209235 A1 | 12/2016 | |

OTHER PUBLICATIONS

JP2010194481A_Yatsugi_translated.pdf (Year: 2010).*
JP4543649B2_Noto_translated.pdf (Year: 2010).*
JP2015127027A_KAJIYAMA_translated.pdf (Year: 2015).*
European Patent Application No. 18743235.6, Office Action dated Feb. 10, 2022.
International Patent Application No. PCT/US2018/039769, International Preliminary Reporton Patentability dated Dec. 29, 2020.
International Patent Application No. PCT/US2018/039769, International Search Report and Written Opinion dated Nov. 6, 2018.
Chinese Patent Application No. 20188095053, Office Action dated Aug. 2, 2022.
Korean Patent Application No. 2021-7002060, Notice of Preliminary Rejection dated Mar. 30, 2023.
Korea Water and Wastewater Association, The standards for sewage facility, p. 53, 54 (2011).

* cited by examiner

WASTEWATER TREATMENT WITH SUSPENDED GROWTH AND MEMBRANE AERATED BIOFILM

CROSS-REFERENCE TO RELATED APPLICATIONS

This application is a National Stage Entry of International Application No. PCT/US2018/039769, filed Jun. 27, 2018.

FIELD

This specification relates to wastewater treatment and to membrane aerated biofilm reactors.

BACKGROUND

Membrane aerated biofilm modules can be installed in one or more process tanks of a wastewater treatment system to form a membrane aerated biofilm reactor (MABR). An attached biofilm forms on the modules and receives oxygen through gas transfer membranes of the modules. When the system also contains mixed liquor with suspended biomass created through an activated sludge (AS) process, a hybrid MABR/AS system is created. In an MABR/AS system, oxidation (i.e. ammonia oxidation such as nitrification) can occur in the membrane aerated biofilm and in the suspended biomass of the mixed liquor. The hybrid system is typically more compact than a conventional AS system providing a similar amount of oxidation. Adding membrane aerated biofilm modules can therefore increase the oxidation capacity of an existing AS sludge system, or can facilitate performing additional processes, such as denitrification or biological phosphorous removal, in an existing AS system.

US Publication Number 2016/0009578 A1, Membrane Assembly for Supporting a Biofilm, describes a cord for supporting a biofilm. The cord has a plurality of yarns, including at least one yarn having a hollow fiber gas transfer membrane. A module has a plurality of the cords potted in at least one header. A reactor has a module immersed in a tank of water to be treated. Air is supplied to the module and travels through a lumen of the gas transfer membrane. A membrane aerated biofilm forms attached to the outside of the cords and receives oxygen through the gas transfer membrane.

US Publication Number 2017/0088449 A1, Wastewater Treatment with Primary Treatment and MBR or MABR-IFAS Reactors, describes various processes for treating wastewater. A supporting structure including gas transfer membranes is immersed in water and oxygen is supplied to an attached membrane aerated biofilm through the membrane. In one example, modules are added to a process tank in an activated sludge reactor. The modules support a nitrifying biofilm, which is immersed in an anoxic suspended biomass in the tank.

International Publication Number WO 2016/209235 A1, Floating Apparatus for Membrane Biofilm Reactor and Process for Water Treatment, describes a module having a plurality of gas transfer membranes. The module floats in water with the membranes submerged in the water supporting a membrane aerated biofilm. The module can be added to a process tank in a conventional activated sludge reactor.

INTRODUCTION

The following is meant to introduce the reader to the invention, but not to limit or define any claimed invention.

In a hybrid MABR/AS system, aerobic mixed liquor can polish the wastewater, for example by oxidizing ammonia remaining in the mixed liquor despite oxidation in the membrane aerated biofilm and any other processes, before the mixed liquor is sent to a secondary separation device. However, ammonia removed in the membrane aerated biofilm does not support the growth of ammonia oxidizing bacteria (AOB) in the aerobic mixed liquor. As a result, the concentration of AOB in the aerobic mixed liquor of an MABR/AS process can be lower than in a conventional AS process with the same total ammonia removal. With other operating parameters kept constant, the concentration of AOB in the aerobic mixed liquor can also decrease when ammonia loading to the system decreases, and the population of AOB available to polish the wastewater can be very low at some times. For example, the population of AOB in a municipal sewage treatment plant can decline overnight. If the ammonia loading to a system increases quickly, for example in the morning, while the population of AOB is very low then ammonia may break through into the system effluent in an amount that exceeds the ammonia discharge limit for the system.

In a process for treating wastewater described herein, wastewater is treated with a membrane aerated biofilm and with an aerobic mixed liquor in a hybrid MABR/AS system. Oxygen is supplied to the biofilm and to the aerobic mixed liquor. The supply of oxygen to the membrane aerated biofilm is modulated in accordance with the ammonia loading to the system or the aerobic mixed liquor, optionally preferentially relative to any modulation of the supply of oxygen to the aerobic mixed liquor. For example, the supply of oxygen to the aerobic mixed liquor may be essentially constant during a period of time in which the supply of oxygen to the membrane aerated biofilm is modulated.

In some examples, the modulation includes reducing the supply of oxygen to the membrane aerated biofilm when the ammonia loading to the system or to the aerobic mixed liquor is reduced. Optionally, reducing the supply of oxygen to the membrane aerated biofilm can include eliminating the supply of oxygen to the membrane aerated biofilm for a period of time. The supply of oxygen to the membrane aerated biofilm can be reduced optionally at least once per week, or at least once per day, for example at night in a municipal sewage treatment plant. Reducing the supply of oxygen to the membrane aerated biofilm when the need for ammonia oxidation is low supports the growth of AOB in the aerobic mixed liquor during these times. When the need for ammonia oxidation increases, a material population of AOB is available in the aerobic mixed liquor, and the supply of oxygen to the membrane-aerated biofilm can be also be returned to an initial level.

If the supply of oxygen to the membrane aerated biofilm is reduced for too long, then the population of AOB in the membrane aerated biofilm could also decline. However, the membrane aerated biofilm is more robust, and has a longer solids retention time (SRT), compared to suspended growth in the aerobic activated sludge. The ability of the hybrid system as a whole to respond to an increase in ammonia loading is therefore enhanced by reducing the supply of oxygen to the membrane aerated biofilm during periods of low ammonia loading.

In some examples, the supply of oxygen to the membrane aerated biofilm can be increased during a period of high ammonia loading. Optionally, the increased supply of oxygen can be achieved by turning on aerators outside of the biofilm to provide aerobic conditions in normally anoxic or anaerobic activated sludge around the membrane aerated biofilm. This causes an outer portion of the biofilm to also become aerobic in addition to enabling the surrounding mixed liquor to nitrify. This process can help prevent an increase in system effluent ammonia concentration, although it may also temporarily increase the nitrate or total nitrogen concentration of the plant effluent, for example by inhibiting denitrification. However, since excess ammonia can be immediately detrimental to a river or lake receiving the system effluent, whereas nitrogen is a nutrient that causes harm only over a long period of time, it can be preferable to avoid temporary peaks in effluent ammonia concentration provided that the average effluent nitrogen concentration over a longer time, for example a week or a month, is acceptable. Further, the average effluent nitrogen concentration may be increased by reducing the supply of oxygen to the membrane aerated biofilm during periods of low ammonia loading.

DETAILED DESCRIPTION

In a process described in further detail below, the flow of air to a membrane aerated biofilm module in a hybrid MABR/AS system is reduced when the ammonia loading to the system, or to an aerobic mixed liquor of the system, is reduced. For example, the flow of air to a membrane aerated biofilm module can be below an initial or average air flow rate during a period of time when ammonia loading to the system or aerobic mixed liquor is below average. The flow of air to the membrane aerated biofilm modules can be at or above the initial rate, or above the average air flow rate, during a period of time when ammonia loading to the system or aerobic mixed liquor is above average. Optionally, reducing the flow of air to the membrane-aerated biofilm can include stopping the flow of air to the biofilm for a period of time. The aerobic mixed liquor may be downstream of the membrane aerated biofilm modules and/or directly upstream of a system outlet.

A reduction in the supply of air to the membrane aerated modules can be made in accordance with a measurement of a process parameter related to the need for ammonia oxidation, for example a decrease in the ammonia loading rate or total Kjeldahl nitrogen (TKN) loading rate. In some systems, a measurement of concentration may be sufficiently correlated to loading rate such that a concentration measurement can be used to provide a loading rate measurement. Alternatively, changes in the supply of air to the membrane aerated modules can be based on a pre-determined schedule considering typical temporal, for example diurnal or weekly, variations in the wastewater treated by the process.

Optionally, a normally anoxic or anaerobic mixed liquor, or a normally anoxic or anaerobic portion of the membrane aerated biofilm, or both, may be temporarily converted to an aerobic state, for example during temporary periods of very high ammonia loading or when transitioning from a period of low ammonia loading to high ammonia loading.

Optionally, the health of the membrane aerated biofilm can be monitored, for example to help avoid, or to provide notice of, damage to the membrane aerated biofilm. In an example, the membrane aerated biofilm is monitored by measuring the concentration of oxygen in air exhausted from the membrane aerated biofilm modules at different ammonia concentrations or loadings.

An example of a hybrid membrane aerated biofilm reactor (MABR) and activated sludge (AS) system is described further below. At least a portion of the AS system includes aerobic mixed liquor. The aerobic mixed liquor includes AOB, for example nitrifying organisms, which help remove ammonia to or below a desired concentration in the system effluent. In some examples of a hybrid MABR/AS system, membrane aerated biofilm modules are located in a tank or zone of a wastewater treatment system upstream of a tank or zone containing aerobic mixed liquor. A process described herein supports the growth of AOB in aerobic mixed liquor during periods of low ammonia loading.

In some example, a hybrid system includes one or more valves and/or air blowers adapted to modulate the supply of air to the membrane aerated biofilm modules. In some examples, the hybrid system may also include a controller adapted to modulate the supply of air to the membrane aerated biofilm modules. Optionally, the controller may be programmed with a predetermined schedule. Optionally, the controller may be connected to one or more sensors, for example a flow meter, ammonia or TKN concentration sensor, or oxygen concentration sensor. A sensor detecting ammonia or a surrogate of ammonia can be located in communication with primary effluent, for example in a feed channel upstream of one or more process tanks, or in communication with aerobic mixed liquor, for example in the aerobic process tank or zone such as in the last third of the aerobic process tank or zone, in a channel carrying aerobic mixed liquor from the last process tank, or in an MABR tank or zone such as in the last third of an MABR tank or zone upstream of an aerobic tank or zone. When a sensor is located, for example, in a feed channel, the sensor can measure the ammonia loading to the system. When a sensor is located in communication with aerobic mixed liquor, the sensor can measure the ammonia loading to the aerobic mixed liquor. However, while process conditions such as aeration rate are kept constant in the MABR tank or zones or can be mathematically adjusted, a sensor in communication with aerobic mixed liquor can also be used to measure the ammonia loading to the system.

Processes for operating a hybrid MABR/AS system are also described herein. In some examples, the flow of air to membrane aerated biofilm modules is below an initial or average air flow rate during a period of time when ammonia loading to the system or aerobic mixed liquor is below average, and at or above the initial rate or above the average air flow rate during a period of time when ammonia loading to the system or aerobic mixed liquor is above average. For example, the flow of air to the membrane aerated biofilm modules can be reduced by 50-100% from an initial or average rate for 2 to 8 hours once or twice a day, at times when the ammonia loading is below average.

The periods of reduced air flow to the membrane aerated biofilm modules may be called relaxation periods. In at least some cases, providing the relaxation periods increases the population of AOB, such as nitrifying bacteria, in aerobic mixed liquor compared to a process in which air is provided to the membrane aerated biofilm modules at an initial rate continuously.

The relaxation periods can correspond with one or more diurnal low loading periods in a municipal sewage treatment plant, for example at night, or at night and mid-day. Alternatively, the flow of air to the membrane aerated biofilm can be reduced according to a longer schedule, for example a weekly schedule. Optionally, the relaxation periods can be controlled by a timer or controller programmed with a pre-determined schedule. In other options, the flow of air to the membrane aerated biofilm is reduced considering one or more process measurements, such as measurements of influent or mixed liquor ammonia loading or concentration. For example, the timing of the relaxation events can be controlled by a controller in communication with an ammonia, total Kjeldahl nitrogen (TKN) or surrogate sensor, and optionally a flow sensor, located for example in a feed channel of the system or in communication with aerobic mixed liquor, or near an outlet from the process tanks.

Figure 1:
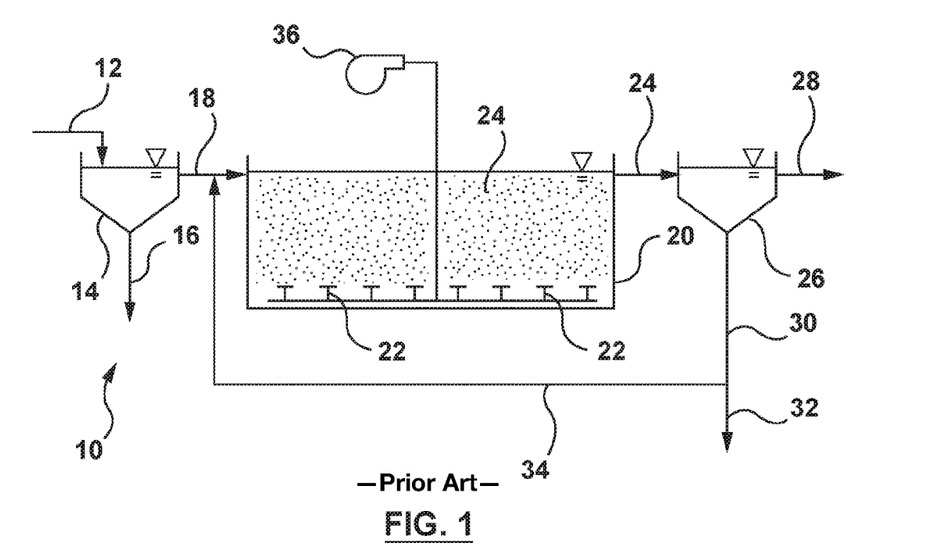
FIG. 1 is a process flow diagram of a simple prior art activated sludge system.

FIG. 1 shows an example of a simple conventional activated sludge (AS) system 10. Wastewater 12, for example municipal sewage, is fed into a primary clarifier 14. The primary clarifier 14 produces primary sludge 16 and primary effluent 18. Primary effluent 18 flows into process tank 20. Process tank 20 has a grid of aerators 22, for example fine bubble aerators. The aerators 22 are supplied with air from a blower 36 in an amount sufficient to keep mixed liquor 24 (the water in the process tank 20) aerobic. Mixed liquor 24 flows to a secondary clarifier 26. Secondary clarifier 26 produces plant effluent 28 and activated sludge 30. The activated sludge 30 is split into waste activated sludge 32 and return activated sludge 34. Return activated sludge 34 returns to process tank 20. Some suspended solids in the wastewater are removed in the primary clarifier. Some of the remaining organic compounds (i.e. biological oxygen demand (BOD)) are removed by suspended biomass in the process tank 20. In particular, ammonia is converted to nitrate by nitrifying bacteria. In other activated sludge systems, more process tanks are added. For example, adding an anoxic or anaerobic tank allows total nitrogen to be reduced by way of a nitrification-denitrification process.

Figure 2:
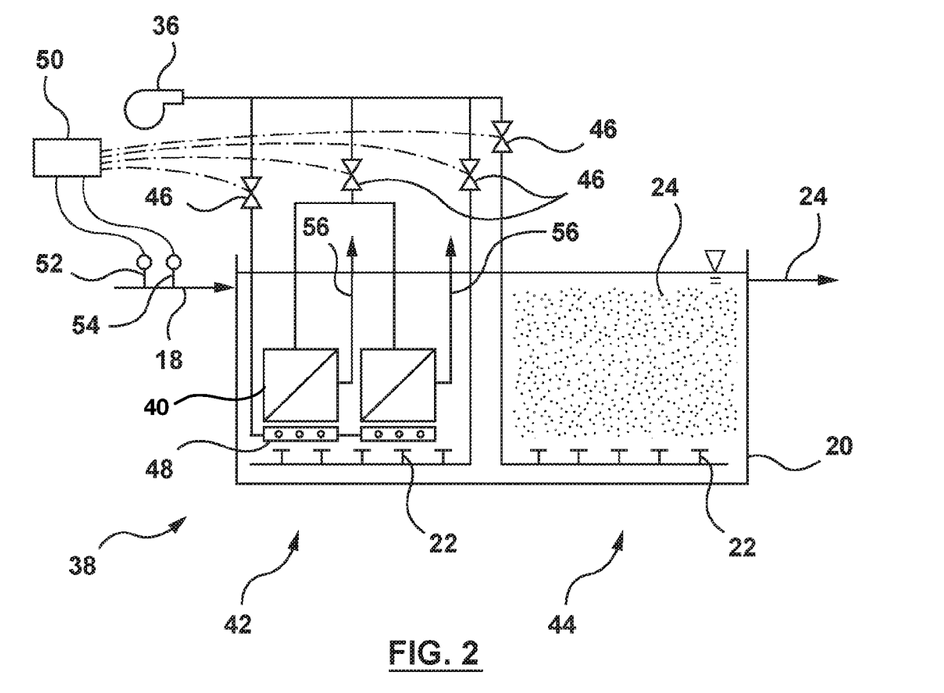
FIG. 2 is a schematic drawing of a process tank of FIG. 1 retrofit with membrane aerated biofilm modules to produce a hybrid membrane aerated biofilm reactor—activated sludge process.

FIG. 2 shows the process tank 20 of FIG. 1 retrofit with membrane aerated biofilm modules (MABM) 40 to form a hybrid membrane aerated biofilm reactor—activated sludge (MABR/AS) system 38. Other parts of the AS system 10 of FIG. 1 are also part of the hybrid system 38 but not shown to simplify FIG. 2. The MABM 40 are placed in an upstream zone 42 of the process tank 20. In the example shown, the aerators 22 are divided into two groups, one in the upstream zone 42 of the process tank 20 and one in a downstream zone 44 of the process tank 20. Optionally, the upstream aerators 22 can be removed. Additional aerators 48, for example coarse bubble aerators or pulsing aerators, are added below the MABM 40 to periodically scour the biofilm and/or refresh mixed liquor 24 in or around the MABM 40.

The upstream aerators 22, downstream aerators 22, MABM 40 and additional aerators 48 are each separately connected to the blower 36 through valves 46. Despite the addition of MABM 40 and additional aerators 48, a larger blower 36 is not required because additional aerators 48 are used only periodically for short periods of time, the supply of air to upstream aerators 22 is typically off, and the MABM 40 transfer oxygen to the mixed liquor 24 more efficiently that the aerators 22.

In ordinary operation, nitrification occurs in at least an interior portion of the biofilm of the MABM 40 and in the mixed liquor 24 of the downstream zone 44, both of which are normally aerobic. Because of the efficient transfer of oxygen to mixed liquor 24 in the biofilm of the MABM 40, total nitrification capacity of the process tank 20 is increased in the MABR/AS system 38 relative to the AS system 10. Further, an outer portion of the biofilm in the MABM 40 and the mixed liquor 24 in the upstream zone 42 can be anoxic or anaerobic, at all times or at least during some times, to provide denitrification. In activated sludge systems with an anoxic or anaerobic process tank upstream of an aerobic process tank, the MABM 40 can be placed in the anoxic/anaerobic tank or the aerobic tank. In either case, a tank or zone with at least normally anoxic or anaerobic mixed liquor (but optionally containing a biofilm with an aerobic portion in the MABM 40) can be provided upstream of a tank or zone with normally aerobic mixed liquor. The downstream aerobic tank or zone can be used to provide polishing nitrification to reduce the ammonia concentration of the plant effluent 28.

The flow of air to the MABM 40 is normally on. The flow rate can be modulated or constant. The air flow rate can be selected to provide ammonia oxidation, for example nitrification, in at least an inner portion of the biofilm. In the case of a modulated air flow, the rate can be varied considering one or more process measurements, for example ammonia or nitrogen (i.e. TKN) loading (i.e. concentration of ammonia or nitrogen in primary effluent 18 multiplied by the flow rate of primary effluent 18). If a constant air flow rate is used, the rate can be an initial rate selected, for example, to provide sufficient ammonia oxidation for ordinary (i.e. daily or weekly) peak ammonia loading events.

During low ammonia loading events, airflow to the MABM 40 can be turned off, or at least reduced relative to the initial rate or an average rate. For example, the air flow can be reduced to 50% or less, or 25% or less, or 10% or less, of the initial rate or average rate. The period of reduced air flow (which could have no air flow) can be called a relaxation period. Air flow, if any, to the MABM 40 during the relaxation period is less than an average air flow to the MABM 40 over a relevant period of, for example, a day or a week.

During a relaxation period, the MABM 40 will not remove ammonia, or will remove less ammonia, thereby increasing the removal of ammonia in the downstream aerobic zone 44 relative to the upstream zone 42. This results in an increase in the inventory of nitrifying organisms or other AOB in the aerobic activated sludge 24 of the downstream zone 44 compared to a process in which there is no relaxation period.

The duration of the relaxation periods can be limited such that the population of AOB in the membrane aerated biofilm is not significantly reduced. However, an adequate population of active AOB can be maintained in the biofilm despite the operation of periodic relaxation events due to the inherent robustness of biofilm processes and due to the biofilm solids residence time (SRT) being significantly longer for attached growth than for bulk suspended growth. For example, one or more relaxation periods collectively providing up to 8 hours of relaxation per day still provides a biofilm that responds to an increase in air flow by quickly returning to a pre-relaxation rate of nitrification or other ammonia oxidation. Longer relaxation periods, for example of up to 24 hours or up to 48 hours, can be used less frequently, for example once a week, if the relaxation period is ended before, for example 4 hours or more or 6 hours or more before, a return to peak ammonia loading. Optionally, the duration of the relaxation period can be, for example, in the range of 2-8 hours when there are one or more daily low loading events, and in the range of 2-24 hours when there are one or more weekly low loading events.

In the example of FIG. 2, a controller 50 communicates with a flow sensor 52 and an ammonia or nitrogen sensor 54 in communication with primary effluent 18. The controller 50 also communicates with the blower 36 and the valves 46. Flow of air to the MABM 40 can be modulated by changing the speed of the blower 36 or the position of the valve 46 connected to the MABM 40 or both. The timing of the relaxation events may be controlled based on measured parameters, for example ammonia or nitrogen, i.e. total Kjeldahl nitrogen (TKN), loading to the process. In another example, the controller 50 may communicate with an ammonia sensor in communication with effluent from a tank or zone containing the MABM 40 or downstream aerobic mixed liquor. A relaxation event can be triggered by the effluent or aerobic mixed liquor ammonia concentration falling to or below a threshold value. In another example, the controller 50 may communicate with an oxygen concentration sensor in an air exhaust line 56 of the MABM 40. A relaxation event can be triggered by the exhaust oxygen concentration reaching or rising above a threshold value.

Alternatively, relaxation events may be provided based on a timer in the controller 50 or a schedule programmed into the controller 50 in situations where low loading events typically occur at the same time. For example, wastewater treatment plants treating municipal sewage typically have low loading events in the middle of the night. In other examples, wastewater treatment plants treating an influent that includes industrial waste can have low loading events on weekends.

In other examples the air flow rate to the MABM 40 can be temporarily increased above the initial rate. This can increase the size of the aerobic portion of the biofilm. Alternatively or additionally, the valve 46 to the upstream aerators 22 can be opened. This can make some or all of the mixed liquor in the upstream zone 42 aerobic and/or create a second aerobic zone in the periphery of the membrane supported biofilm. In either case, the population of AOB is increased. These techniques can be used, for example, when there is an unusually high ammonia loading, or when transitioning out of a low ammonia loading period. For example, some wastewater treatment plants have increased ammonia loading events once or twice weekly due to the addition of a liquid fraction produced by dewatering waste sludge, or occasionally due to weather.

In a very long relaxation period, for example a relaxation period of 8 hours or more, it may be useful to check that the membrane aerated biofilm is still healthy. While air is provided at the initial rate, data can be collected to produce a graph comparing the concentration of oxygen in the MABM exhaust to the ammonia loading rate or concentration. During a relaxation period, the air flow rate to the MABM 40 can be temporarily increased to the initial rate. If the concentration of oxygen in the MABM exhaust is close to the value predicted by the graph given the current ammonia loading rate or concentration, then the biofilm is still healthy and able to respond quickly to an increase in air flow rate. Alternatively, while operated at a reduced air flow rate, the oxygen concentration of the MABM exhaust can be measured at a variety of ammonia concentrations or loadings. A generally linear relationship between exhaust oxygen concentration and ammonia concentration or loading (with exhaust oxygen concentration decreasing at increased ammonia concentration) while air flow rate is constant suggests a healthy biofilm.

The duration of a relaxation period can be predetermined. Alternatively, a relaxation period can be ended by sensing a reversal of a condition that triggered the start of a relaxation period. In another option, the end of a relaxation period can be triggered based on an ammonia concentration in the aerobic mixed liquor, for example as determined by a sensor in or near the aerobic mixed liquor zone (for example in the last third of the length of the aerobic tank or zone) or in the effluent from the aerobic mixed liquor zone. If the ammonia concentration approaches a predetermined limit, then air flow is increased to the MABM 40, for example to the initial rate. If the ammonia concentration continues to rise, then air can also be provided to the upstream aerators 22. Airflow to the upstream aerators 22 can be stopped if the ammonia concentration stabilizes below the limit. The start of another relaxation period can be triggered as described above, or by a decline in the aerobic mixed liquor ammonia concentration.

Optionally, during a very low ammonia loading event, the air flow rate to the downstream aerators 22 could also be reduced. However, any reduction in air flow to the downstream aerators 22 is preferably not as large of a percentage decrease or for as long a time as a reduction in air flow rate to the MABM 40. In this way, total air flow is modulated according to ammonia loading but with the modulation applied preferentially, i.e. to a relatively greater extent, to the membrane aerated biofilm compared to the aerobic mixed liquor. Alternatively, the air flow rate to the downstream aerators 22 can be essentially constant.

In some examples, a hierarchy could be followed whereby a decrease in total system aeration rate made during a period of reduced or decreasing ammonia loading is applied first to upstream aerators 22 if operating, second to the MABM 40 and third to the downstream aerators 22. An increase in total system aeration rate made during a period of increased or increasing ammonia loading is applied first to the downstream aerators 22, then to the MABM 40 and, if necessary, third to the upstream aerators 22. However, it is expected that in most cases air flow to the downstream aerators 22 will not need to be modulated to provide a sufficiently efficient and responsive system. Air flow to the downstream aerators 22 is preferably not modulated, at least on a daily or weekly basis, to avoid reducing the population of ammonia oxidizing bacteria (AOB) in the aerobic mixed liquor. In many cases air flow to the upstream aerators 22 will also not need to be modulated to provide a sufficiently efficient and responsive system, except possibly in response to less frequent (i.e. once weekly or less frequent) high ammonia loading events or events of long (i.e 24 hours or more) duration. Optionally, essentially all modulation of system air flow in response to variations in ammonia loading, or at least in response to diurnal or weekly variations in ammonia loading, can be provided by varying the flow of air to the MABM 40.

On a design basis, initial air flow rates to the MABM 40 and downstream aerators 22 can be selected to give desired nitrogen and ammonia removal. However, where variations in the air flow to the MABM 40 as discussed herein can be anticipated, then the variable or average air flow to the MABM 40 can be considered during the design process. Alternatively, in examples when denitrification is not required, the mixed liquor around the MABR can be normally aerobic and the upstream aerators 22 can be operated as for the downstream aerators 22.

In a hybrid MABR/AS process that must meet a low effluent ammonia concentration (for example <5 mg/L), the aerobic mixed liquor will typically be relied on to remove or polish the ammonia not removed by the upstream MABR. That is to say that the hybrid MABR/AS will not rely on the MABR for all of the ammonia removal. Because removing ammonia at low concentrations (polishing) can be more difficult than removing ammonia at higher concentrations, a robust inventory of nitrifying organisms, or more generally ammonia oxidizing bacteria (AOB), is required in the aerobic mixed liquor.

Conventional operation of an MABR/AS can result in a lower population of AOB than a conventional AS process (for a given SRT) and thus may make the MABR/AS less able at some times to provide the polishing required to meet low effluent ammonia concentrations. The systems and processes described above addresses this challenge by allowing normally aerobic mixed liquor, for example mixed liquor in a zone or tank downstream of a zone or tank containing the MABM, to be supplied with air preferentially during low ammonia loading events. This helps maintain the AOB in the aerobic mixed liquor during low loading events when less, or no, ammonia removal in the membrane aerated biofilm is required. The timing of relaxation events, wherein the air flow to the membrane aerated biofilm is reduced below the average or initial rate, coincides with low ammonia loading events. However, the likelihood of having effluent ammonia exceed a design limit is minimized because the overall inventory of AOB in the biofilm and aerobic mixed liquor combined is increased compared to a process without relaxation events or even a process in which the air flow rate is modulated on a pro rata basis to the membrane aerated biofilm and the aerobic mixed liquor. The systems and processes described above may thereby help a hybrid MABRS/AS to meet stringent effluent ammonia limits in applications with varying ammonia loading rates.

Figure 3:
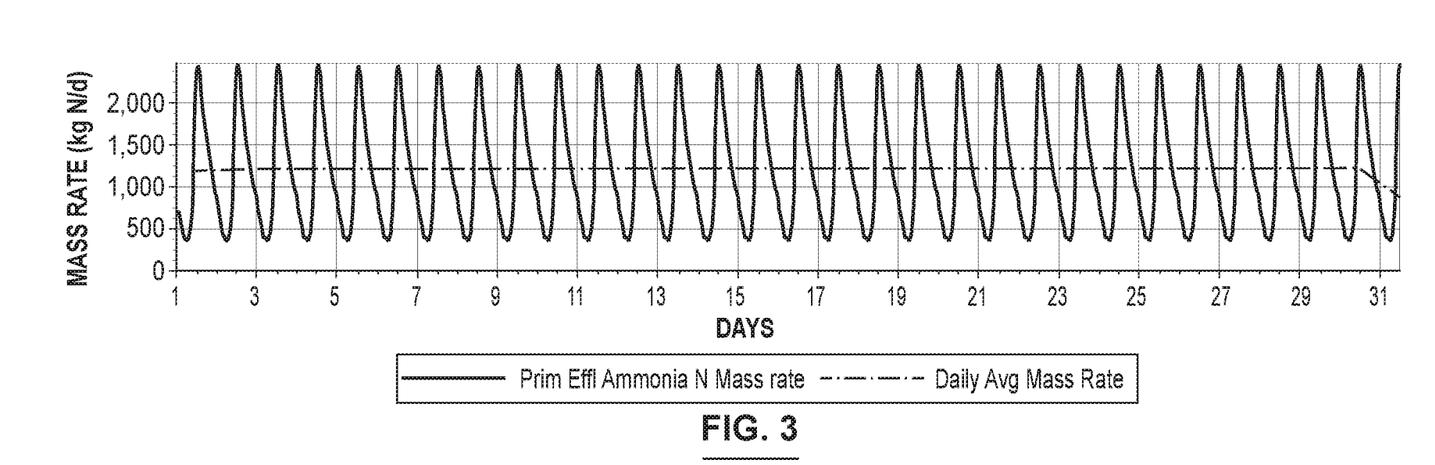
FIG. 3 shows influent nitrogen loading rate according to a modeling example.
Figure 4:
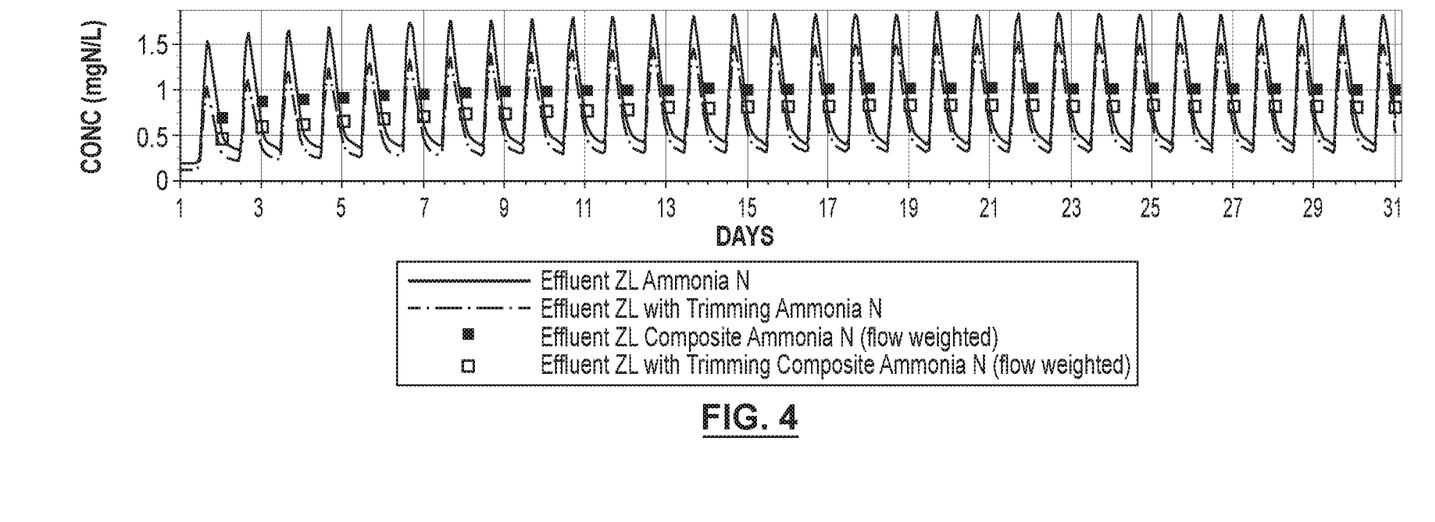
FIG. 4 shows effluent ammonia concentration according to the modeling example.
Figure 5:
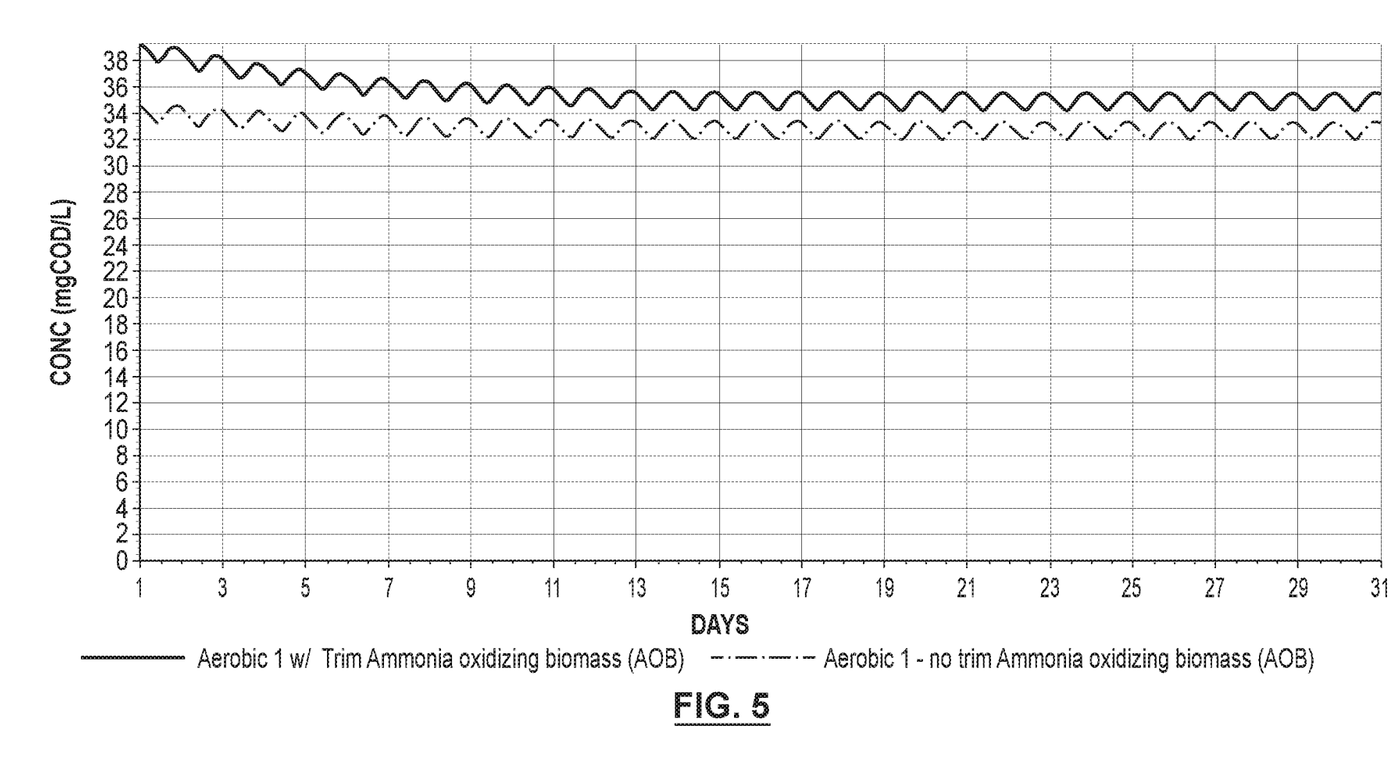
FIG. 5 shows the population of ammonia oxidizing bacteria according to the modeling example.

In an example, a hybrid system was modeled. The hybrid system had an anaerobic tank with MABM followed by an aerobic tank. The ammonia nitrogen loading rate, measured in the primary effluent, is shown in FIG. 3. The ammonia nitrogen loading had a diurnal profile with a peaking factor of about 2. Operation of the hybrid system was simulated a) with airflow to the MABM at a constant initial rate and b) with relaxation, called "trimming" in FIGS. 4 and 5, in which the airflow was turned off between 12 am and 8 am and 130 Nm3/h the rest of the day. As shown in FIG. 4, the peak effluent ammonia concentration is about 0.5 mg/L less on most days with trimming. As shown in FIG. 5, the concentration of ammonia oxidizing bacteria (AOB) in the aerobic mixed liquor is consistently about 2 mg/L higher with trimming.

In another example, a pilot plant was operated with an upstream zone containing MABM and fine bubble aerators that were normally off, and a downstream aerobic zone with fine bubble aerators that were normally on. Influent ammonia concentration was typically 15-20 mg/L and effluent ammonia concentration was less than 5 mg/L. However, over a period of 5 months there were three high ammonia loading events in which the influent ammonia concentration exceeded 25 mg/L for about a week. In the first event, the upstream fine bubble aerators were left off and the effluent ammonia concentration exceed 5 mg/L at some times. In the second and third events, the upstream fine bubble aerators were turned on and the effluent ammonia concentration stayed below 5 mg/L.

In the description above, unless a different meaning is apparent from the context, mixed liquor is aerobic when it is normally aerobic, for example aerobic for at least ⅔ of the time over a long period of time such as a month. Similarly mixed liquor is anoxic or anaerobic when it is normally anoxic or anaerobic, for example anoxic or anaerobic for at least ⅔ of the time over a long period of time such as a month. Modulating the supply of the supply of oxygen to the membrane aerated biofilm preferentially means that the change in oxygen supply rate to the membrane aerated biofilm is greater, for example at least 50% greater, than any change in oxygen supply rate to the aerobic mixed liquor. Modulating in accordance with ammonia loading can include considering a signal or measurement indicative of real time ammonia loading or considering a change in ammonia loading that is predicted, for example because a similar change has been observed to occur in the past. The word "air" optionally includes oxygen or a mixture of gasses comprising oxygen. Mixed liquor typically includes suspended growth but might also include attached growth supported by non-membrane media. Air flow rates are constant or non-modulated if they are essentially constant, for example they do not vary by more than about 15% over a period of time. A relevant period of time is one of a series of consecutive periods, for example a day or a week, each of which includes a similar change in ammonia loading. One relevant period of time could occur within a longer relevant period of time, for example a daily variation within a weekly variation. Average air flow rates or ammonia loading rates can be calculated as a time weighted average over a relevant period of time. A membrane aerated biofilm, alternatively called a membrane supported biofilm, is a biofilm attached to a supporting structure that receives oxygen through a gas transfer membrane of the supporting structure. References to nitrifying organisms apply to ammonia oxidizing bacteria (AOB) generally. References to an initial air flow rate refer to a normal, ordinary or design rate, for example a rate that is essentially constant for most of the day on most days, for example for 16 hours or more on ⅔ or more of the days in a month. In examples where there is no such initial rate, an average rate, for example a time weighted average over a relevant period of time, can be used in place of the initial rate. A relaxation period typically involved reducing the supply of oxygen to a membrane supported biofilm or reducing the supply of air to an MABM by at least 50% relative to an initial or average value.

US Publication Number 2016/0009578 A1, Membrane Assembly for Supporting a Biofilm; US Publication Number 2017/0088449 A1, Wastewater Treatment with Primary Treatment and MBR or MABR-IFAS Reactors; and, International Publication Number WO 2016/209235 A1, Floating Apparatus for Membrane Biofilm Reactor and Process for Water Treatment, are incorporated herein by reference.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

We claim:

1. A process for treating wastewater in a hybrid membrane aerated biofilm reactor—activated sludge system, the process comprising the steps of:

treating the wastewater with a membrane aerated biofilm and with an aerobic mixed liquor;

providing a first supply of oxygen to the membrane aerated biofilm through a gas transfer membrane;

providing a second supply of oxygen to the aerobic mixed liquor through aerators located downstream of the membrane aerated biofilm; and modulating the first supply of oxygen to the membrane aerated biofilm in accordance with an ammonia loading to the hybrid membrane aerated biofilm reactor—activated sludge system or to the aerobic mixed liquor and constantly supplying the second supply of oxygen over a period of time to the aerobic mixed liquor through the aerators located downstream of the membrane aerated biofilm during the modulating step.

2. The process of claim 1 wherein the first supply of oxygen to the membrane aerated biofilm is modulated at least once a week.

3. The process of claim 1 wherein modulating includes reducing the supply of oxygen to the membrane aerated biofilm by 50% to 100% relative to an average or initial value.

4. The process of claim 1 comprising supplying oxygen through the aerators to mixed liquor in a zone or tank containing the gas transfer membrane in accordance with an increase in the ammonia loading.

5. The process of claim 1 wherein the first supply of oxygen to the membrane aerated biofilm is modulated according to a predetermined schedule.

6. The process of claim 1 wherein the first supply of oxygen to the membrane aerated biofilm is modulated according to a sensed value related to an ammonia loading rate.

7. The process of claim 6 wherein the sensed value is an ammonia concentration.

8. The process of claim 1 wherein the modulating step includes reducing the first supply of oxygen to the membrane aerated biofilm for 2-8 hours per day.

9. The process of claim 1 wherein the modulating step includes reducing the first supply of oxygen to the membrane aerated biofilm at night in a municipal sewage treatment plant.

10. The process of claim 1 wherein the first supply of oxygen to the membrane aerated biofilm is below an average oxygen flow rate during a period of time when ammonia loading to the hybrid membrane aerated biofilm reactor—activated sludge system is below average, and above an average oxygen flow rate during a period of time when ammonia loading to the hybrid membrane aerated biofilm reactor—activated sludge system is above average.

11. The process of claim 1 wherein the hybrid membrane aerated biofilm reactor—activated sludge system comprises an ammonia, total Kjeldahl nitrogen (TKN) or surrogate sensor, or a membrane aerated biofilm module exhaust sensor.

12. The process of claim 1 wherein the hybrid membrane aerated biofilm reactor—activated sludge system comprises an ammonia sensor.

13. The process of claim 12 wherein the ammonia sensor is located in a feed channel of the hybrid membrane aerated biofilm reactor—activated sludge system, in a tank or zone around the membrane aerated biofilm, or in the aerobic mixed liquor.

14. The process of claim 1 wherein the first supply of oxygen to the membrane aerated biofilm is modulated at least once per day.

* * * * *